United States Patent
Lindsey

[15] 3,638,235
[45] Jan. 25, 1972

[54] BOREHOLE TOOL
[72] Inventor: James M. Lindsey, Houston, Tex.
[73] Assignee: Sperry Sun Well Surveying Company, Sugar Land, Tex.
[22] Filed: Apr. 2, 1970
[21] Appl. No.: 25,003

[52] U.S. Cl. .................346/107 W, 33/205.5 P, 307/116
[51] Int. Cl. ..............................................E21b 47/022
[58] Field of Search........346/107 W, 7; 33/205.5 P, 205.5 E; 95/11 HC; 175/45; 307/116

[56] References Cited
UNITED STATES PATENTS
3,546,478  12/1970  Lindsey ..............................307/116

Primary Examiner—Joseph W. Hartary
Attorney—George L. Church, Donald R. Johnson, Wilmer E. McCorquodale, Jr. and John E. Holder

[57] ABSTRACT

The particular embodiment described herein as illustrative of one form of the invention utilizes a motion-sensing device to control the operation of a timing circuit in a downhole borehole tool. The absence of motion for a predetermined period is indicative of the tool being at its operating position and permits an electronic counting circuit to initiate signals for operating the tool. Once the tool has operated, the circuit incorporates means for preventing further operation of the tool until the circuit is reset at the surface.

7 Claims, 3 Drawing Figures

PATENTED JAN 25 1972 3,638,235

INVENTOR
JAMES M. LINDSEY

John E. Holder
ATTORNEY

BOREHOLE TOOL

BACKGROUND OF THE INVENTION

The present invention pertains to a borehole tool and more particularly to a device for initiating the operation of such a tool upon its being maintained in a motionless condition for a predetermined time period in the borehole.

When drilling boreholes in the ground, particularly boreholes which run partly through rock and partly through looser earth layers, it often happens that the dip or inclination of the hole to the horizontal plane as well as the direction of the hole will vary quite considerably at different depths of the hole. In many cases, therefore, it is important to determine the existing deviations from a desired inclination and direction.

One such apparatus which has been used for the purposes outlined above is termed a single-shot magnetic directional survey instrument. Such an instrument is used to obtain a single record of the inclination and the direction of inclination at various depths in a borehole. The instrument is used for the purpose of orienting a hole in directional drilling operations, and also to chart the course of boreholes from surface to total depth during a normal drilling operation. The directional features of the instrument consist of a magnetic compass. The inclination unit is a form of inverted plumb bob. These two features are combined into a single compass angle unit which may be available in various ranges of degrees of inclination. A camera unit in the instrument makes a permanent record of the compass angle unit reading at a preset moment in time. Electrical power to operate lamps in the camera unit may be furnished by batteries or by a conductor cable suspending the instrument from the earth's surface. An electrical circuit for activating the lamps is controlled by a clock which allows a predetermined exposure period of a film disc for recording the inclination and direction of inclination indicated by the compass angle unit. An adjustment feature on the clock allows the clock to be set for delayed times ranging from a few seconds to several hours.

In operating such an apparatus, a desired compass angle unit is selected and assembled, and the batteries and film are loaded with the clock being set for the delayed time needed to reach the survey depth. The instrument is then assembled into a protective casing which can be lowered and positioned in a nonmagnetic drill collar at the lower end of the drill stem with the apparatus being suspended on a wire line. Alternatively, the apparatus may be go-deviled into a nonmagnetic drill collar and retrieved with an overshot or by pulling the drill string. The instrument may also be lowered into an open hole on a wire line, or by any other convenient method. The compass angle unit is normally comprised of a floating magnetic needle designed so that its directional and angular position may be simultaneously photographed on a disc.

Clock-operated survey instruments may be assembled and programmed just prior to the survey, since the clock must be set just before the instrument is placed in the well. This is due to the many contingent features that may occur in the drilling of a well which might delay the surveying of the well.

In order to set an appropriate delay time in the timing mechanism of the instrument, an estimation must be made as to the time it will take the instrument to be assembled and then either lowered into the wellbore on a wire line or go-deviled to the bottom. In any event, since the time lapse cannot be predicted with precise certainty, a liberal safety factor must be employed to insure that sufficient time will elapse to permit the instrument to be landed at the bottom of the borehole or at survey depth. In addition, time must be permitted for the instrument to cease moving or become quiet so that an accurate survey may be performed. Upon lapse of the predetermined time, a lamp circuit is activated which exposes the film that records an image of the compass angle unit.

Since a safety factor must be employed in determining the time for landing the instrument, a considerable amount of rig time may be used in the running of such a survey. If a directional hole is being drilled for example, and several surveys are run in the course of a day to determine the orientation of the hole, the rig time expended may become critical, particularly in situations such as offshore operations where rig costs are extremely high.

Electronic circuitry which may be employed to operate such an apparatus must be reliable and simple, not only to keep equipment costs low, but to provide for low maintenance and repair costs. The simplicity of such circuitry may be an important factor in reducing the size of the borehole tool, a factor that is always important in the design of such tools.

It is therefore an object of the present invention to provide a new and simplified device for operating downhole borehole tools.

SUMMARY OF THE INVENTION

With this and other objects in view, the present invention contemplates an apparatus for initiating the operation of a downhole borehole tool, and includes a motion-sensitive device which detects the presence of motion as the tool is being assembled and moved into an operating position in the borehole. The motion-detecting device prevents the operation of the tool as long as the tool is in motion. Upon cessation of such motion, a solid-state timing device is activated, which in turn causes an electrical signal to be sent to portions of the tool to be operated by such electrical signals. After a lapse of a predetermined period of time, the electrical signal for operating the tool is interrupted, and a cutoff signal is applied to the timing device to deactivate such timing device. Thus the tool will only be operated one time.

A complete understanding of this invention may be had by reference to the following detailed description, when considered in conjunction with the accompanying drawings illustrating embodiments thereof.

BRIEF DESCRIPTION OF THE DRAWINGS

FIG. 2 is a schematic diagram of an electrical circuit embodying principles of the present invention.

DESCRIPTION OF THE PREFERRED EMBODIMENTS

Figure 1:
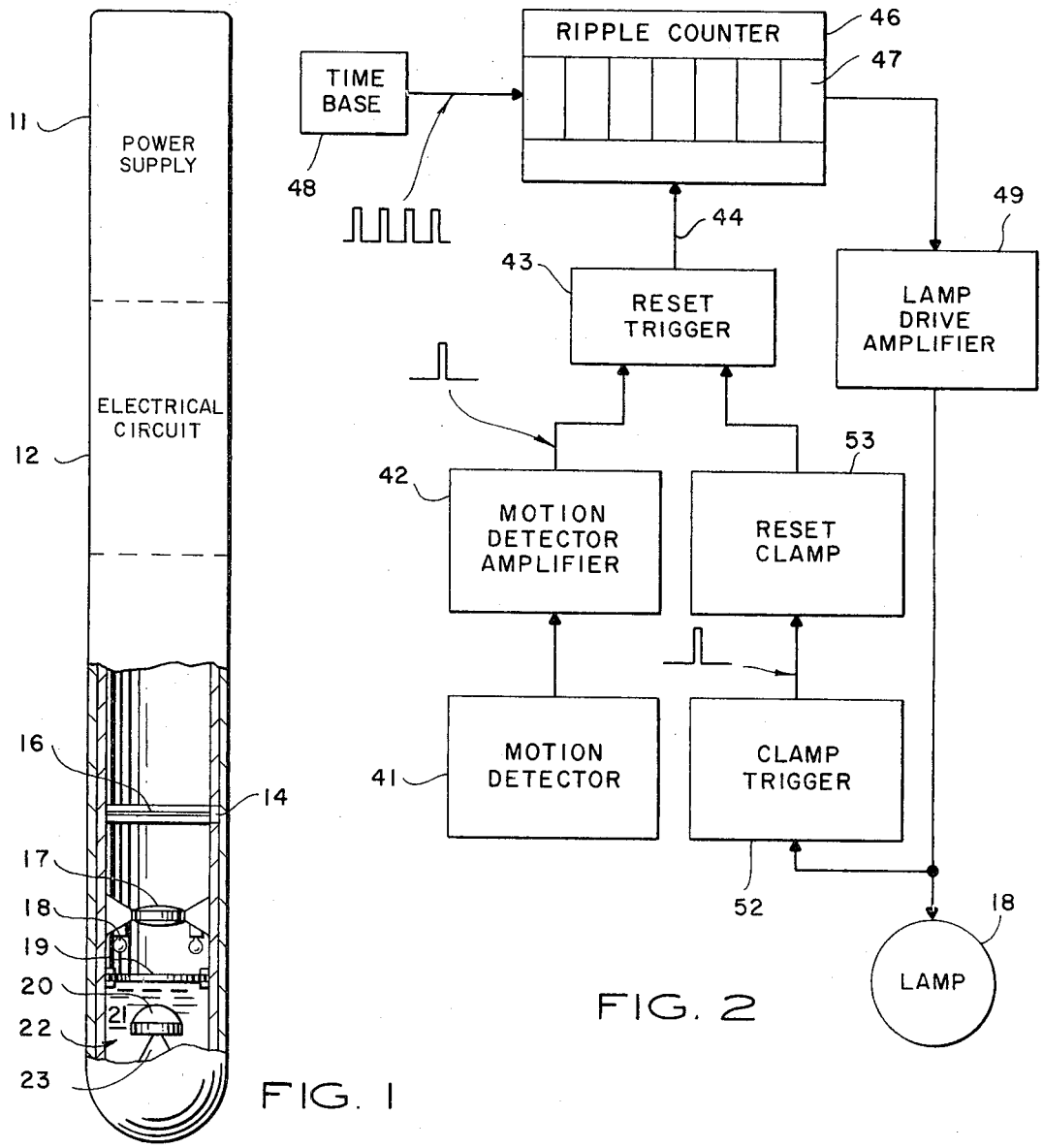
FIG. 1 is a schematic view of an instrument for utilizing principles of the present invention.

Referring first to FIG. 1 of the drawings, a schematic view of a borehole surveying instrument includes at the upper end of the instrument a power supply section 11 which may be in the form of a battery pack or a power supply circuit receiving its power from a conductor cable (not shown) extending to the surface. Immediately below the power supply housing is a control circuit housing 12 which contains the electrical circuitry for operating the surveying apparatus. The lower section 13 of the tool houses the survey instrument and includes a slot 14 for receiving a film disc 16 for recording the survey. Below the film disc is a lens 17 with lamps 18 being positioned below the lens. A glass disc 19 which contains a reticle in its center is positioned below the lamps in the housing. The glass disc also forms the upper end of a chamber 21 containing a fluid in which a compass angle unit 22 is pivotally floated. Indicia on the head 20 of the compass angle unit provides a visual indication of the direction and inclination of the tool housing. The buoyancy of the fluid in the chamber maintains the compass angle unit in a vertical position on its pivot 23 throughout various positionings of the instrument housing in the borehole.

In the operation of the instrument described above, the electrical circuit is activated at some instant of time to energize the lamps 18. The light emanating therefrom is directed through the glass disc 19 onto the head 20 of the compass angle unit 22. The compass angle unit includes a magnetic needle which is oriented in a north-south direction. In addition, the unit is permitted to tilt on its pivot 23 away from the longitudinal axis of the tool, to provide an indication of the inclination of the tool in the wellbore. Light impinging upon the head 20 of the unit is reflected back through the glass enclosure 19 and the reticle thereon, through the lens 17, and on to the film disc 16. Therefore, while the lamps are lighted, the film disc is exposed to the image presented by the compass angle unit head and the reticle engraved on the glass. The record of this image provides an indication of the direction and inclination of the borehole.

The present invention pertains to an improved device for initiating and timing the operation of an instrument such as a directional surveying instrument. However, it is pointed out that the timing circuit would have application to other types of borehole tools.

Figure 3:
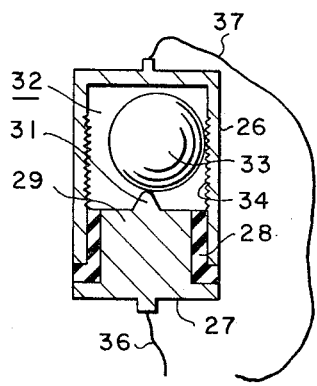
FIG. 3 shows a motion-detecting device for use with the present invention.

The apparatus of the present invention incorporates in an electrical circuit, a motion-sensing device such as the ones shown in FIG. 3 of the drawings. The apparatus of FIG. 3 includes a conductive housing 26. The housing is open at one end for receiving a plug 27 made of a conductive material. The plug is separated from the housing by an insulator 28 to provide a pair of electrically insulated conducting surfaces. The plug 27 has an upwardly extending portion 29 which is also insulated from the housing, and which has a pivot point 31 at its upper end. The space between the upper end of the upwardly extending portion 29 and the top of the housing 26 forms a chamber 32 which is sized to receive a ball 33. The ball is constructed of chrome or other such electrically conducting material. The inside wall surfaces 34 of the housing 26 which surround the chamber 32 are preferably roughened or threaded to provide a multiplicity of contacting points thereon which renders the device more sensitive to motion thereof. The ball is received within the chamber 32 and in a motionless condition, the ball will rest on the pivot point 31 and against the inside roughened surfaces of the wall 34 of the housing. In this condition, the ball 33 establishes a conducting path between the plug 27 and the housing 26 which are furnished with respective contacts and conducting wires 36, 37. The roughened walls of the housing form a more elastic surface to increase motion of the ball and thus sensitivity of the motion detector. As the ball rests upon the pivot 31 in the chamber 32, a slight movement of the instrument causes the ball to move on the pivot from one wall portion to the other, thus intermittently making and breaking a conducting path in an electrical circuit including wires 36 and 37. The apparatus described above, including the motion detector, is also described in a copending U.S. application of James M. Lindsey, Ser. No. 776,184, filed Nov. 15th, 1968, now Pat. No. 3,546,478.

Referring now to FIG. 2 of the drawings, a circuit is shown for utilizing signals from the motion-sensing device described above for operating in a borehole instrument. The circuit includes a motion detector 41 such as the one described above, which provides a signal indicative of motion of the tool to a motion detector amplifier 42. The motion detector amplifier feeds the signal from the detector to a reset trigger 43 which in turn sends a pulse over a reset line 44 to a counter circuit 46. The reset trigger 43 is a transistor switching circuit which operates in response to signals from the motion detector amplifier. The reset trigger output is normally at zero-voltage level, but upon receiving trigger signals from the motion detector amplifier 42, the output of the reset trigger changes to a high level, which resets the counter 46 to zero. The counter 46 is comprised of a series of AC flip-flops 47 arranged in a ripple count configuration. At time base circuit 48 which is comprised of a low-frequency, unijunction oscillator provides a continuous output of positive going pulses to the ripple counter.

The output signal of the ripple counter is fed to a lamp drive amplifier 49, which in turn provides the necessary power to lamps 18 (FIG. 1) or other device to be operated within the borehole tool. When the lamp drive amplifier ceases to operate, a negative signal is applied to a clamp trigger 52, which is a monostable multivibrator or one-shot providing a one-pulse output which in turn is fed to a reset clamp 53, whereupon the clamp trigger 52 goes back to zero. The reset clamp 53, however, is similar to a flip-flop and the single positive pulse from the clamp trigger 52 activates the reset clamp to provide a continuous positive output of the reset clamp as long as there is battery voltage on the reset clamp, even though the clamp trigger goes back to zero. The continuous output of the reset clamp is fed to the reset trigger 43. The reset trigger in turn puts a continuous reset signal of positive voltage on the reset line 44 which keeps the counter 46 set to zero. The counter goes to zero any time a voltage is on the reset line 44, with the output of the reset trigger 43 being a continuous voltage when the reset clamp has been activated. On the other hand, when the signal for activating the reset trigger 43 is provided by the motion detector amplifier, the reset trigger conducts to form only a positive spike when the motion detector is closed or in other words, when the motion detector is outputting a signal.

In the operation of the circuit described above, the time base 48 generates pulses that are fed to the flip-flop counter 46 and counted by the counting apparatus. At the end of some predetermined period of time which, for example, in the present application for driving lamps in a photographic process is several seconds, the ripple counter will have an output voltage on the last flip-flop. This causes the lamp drive amplifier 49 to turn on the lamps 18 which expose the film disc 16 to an instrument image. If the motion detector 41 senses motion within this predetermined period of lamp operation, its signal is amplified and sent to the reset trigger 43, which in turn sends a pulse to the counter 46 resetting all the flip-flops 47 to zero. Thus the counter starts its counting sequence over again in the absence of such signal from the motion detector.

When the lamp drive amplifier 49 is activated by the positive output of the ripple counter 46, the lamp drive amplifier will supply power to the lamps. Power is supplied to the lamps for a period equal to the time it takes to place a positive voltage on the last flip-flop in the series. The last flip-flop in a ripple counter will conduct for such a period, this being the nature of operation of a ripple counter. However, if motion is detected by the motion detector 41 during the period that the lamp drive amplifier normally is conducting, such motion detector signal will be passed through the reset amplifier to the ripple counter, which will set all the flip-flops in the ripple counter to zero and stop the lamp drive amplifier from conducting for its normal period. The circuit may be designed, if desirable, to provide for continuous operation of the lamps for the normal period of the counter, once the lights have turned on, regardless of motion from the motion detector.

When the lamps turn off, whether by operation of the counter or the motion detector, the negative signal from the lamp drive amplifier is passed to the clamp trigger 52 which sends a pulse to the reset clamp 53. The reset clamp provides a continuous output to the reset trigger, which in turn provides a continuous reset voltage to the counter, thereby keeping the counter set to zero. To reset the circuits or deactivate the reset clamp, the battery voltage must be broken.

In the operation of the borehole tool and circuit just described, the well tool is provided with power such as by the insertion of batteries into the power supply section 11 just prior to inserting the tool into the well, whereupon motion will be sensed by the motion detector until the tool has reached its operating position in the borehole. When detecting the motion which would normally be present while the tool is being assembled and positioned for running into the wellbore, the motion detector 41 will cause an output signal from the motion detector amplifier 42 to the reset trigger 43. The resulting output from the reset trigger 43 is fed to the ripple counter 46, thus continuously resetting the flip-flops of the counter to zero. Such a condition will prevail until motion ceases for a period of time sufficient to cause the time base 48 to send pulses to the counter for sufficient time to place a voltage on the last flip-flop in the series. The lamp drive amplifier 49 is activated to send power to the lamps 18 and a photographic record is made of the instrument. The counter continues to step for the operating period of the counter whereupon the last flip-flop receives a zero voltage to stop power application to the lamps and also send a negative signal to the clamp trigger 52. This in turn causes the reset trigger to operate continuously to prevent further application of power to the lamp until the tool is retrieved to the surface and battery power to the circuit is broken.

While a particular embodiment of the present invention has been shown and described, it is apparent that changes and modifications may be made without departing from this invention in its broader aspects, and therefore, the aim in the appended claims is to cover all such changes and modifications as fall within the true spirit and scope of this invention.

What is claimed is:

1. In an apparatus for controlling the operation of a borehole tool function: counting means for initiating signals to start and stop an operation of the borehole tool after a predetermined time lapse from a zero time reference; means responsive to a downhole event for resetting said counting means to said zero time reference; and means responsive to the stopping of the operation of said borehole tool for continuously operating said resetting means.

2. The apparatus of claim 1 wherein said counting means is comprised of a series of flip-flop circuits in ripple count configuration.

3. The apparatus of claim 1 and further including a motion detector for determining the downhole event and wherein said resetting means includes a trigger circuit arranged so that said motion detector activates said trigger circuit to send a resetting signal to said counting means.

4. The apparatus of claim 1 wherein said means for continuously operating said resetting means includes a clamping circuit responsive to the cessation of a signal from said counting means for providing a continuous signal output to said resetting means.

5. The apparatus of claim 4 wherein said clamping circuit includes a one-shot responsive to the cessation of the borehole tool operating signal for providing a single output pulse and a solid-state switch which is responsive to said single output pulse for providing a continuous signal to said resetting means.

6. In a downhole surveying instrument having a photographic system including a lamp for photographing an instrument indicative of a borehole parameter, means for initiating and stopping the application of electrical power to the lamp, which means comprises: motion-detecting means for providing an electrical signal indicative of the absence of motion of the instrument; counting means operative over a predetermined time period from a zero time reference for providing an output signal to operate the lamp; means for continuously providing timed output pulses directly to said counting means for operating said counting means; resetting means responsive to the signal from said motion-detecting means for setting said counting means to the zero time reference; and clamping means responsive to the cessation of the signal from said counting means after the predetermined time period for supplying a continuous signal to said resetting means.

7. The apparatus of claim 6 wherein said counting means is comprised of a series of flip-flops in ripple count configuration.

* * * * *